April 19, 1960 — L. O. CARLSEN — 2,932,923
MACHINE FOR GENERATING GEARS
Filed March 5, 1958 — 4 Sheets-Sheet 1

INVENTOR.
LEONARD O. CARLSEN
BY
ATTORNEY

April 19, 1960

L. O. CARLSEN 2,932,923

MACHINE FOR GENERATING GEARS

Filed March 5, 1958

April 19, 1960     L. O. CARLSEN     2,932,923
MACHINE FOR GENERATING GEARS
Filed March 5, 1958                   4 Sheets-Sheet 3

April 19, 1960 L. O. CARLSEN 2,932,923
MACHINE FOR GENERATING GEARS
Filed March 5, 1958 4 Sheets-Sheet 4

United States Patent Office 2,932,923
Patented Apr. 19, 1960

2,932,923

MACHINE FOR GENERATING GEARS

Leonard O. Carlsen, Rochester, N.Y., assignor to The Gleason Works, Rochester, N.Y., a corporation of New York Application March 5, 1958, Serial No. 719,381

9 Claims. (Cl. 51—33)

The present invention relates to an improved machine for producing gears by methods of generation disclosed in Patent No. 2,824,498, granted to M. L. Baxter, Jr. and L. O. Carlsen.

One of the disclosed methods, for generating long-cone-distance bevel gears, comprises effecting simultaneously, and in predetermined velocity ratio, (a) angular motion of a tool carrying cradle about an axis representing the axis of a generating gear of which the tool represents a tooth surface, (b) angular motion of the work spindle to rotate the gear being cut about its own axis, as though it were running in mesh with such generating gear, and (c) rectilinear motion of the work spindle in a direction perpendicular to both the cradle axis and the work spindle axis. In conventional bevel gear generating machines, in order to accommodate work gears of different design, it is required that the work head, in which the work spindle is rotatable, be adjustable relative to the cradle support. These motion and adjustment requirements necessitate a relatively long and complex drive train connecting the cradle and the work spindle for angular motion. The train must extend from the cradle support to the adjustable work head. In machines heretofore proposed for carrying out the long-cone-distance gear generating method referred to above, an additional drive train of similar extent has also been required to connect the cradle and the work head.

One of the primary objects of the present invention is to simplify the machine, particularly in a way which will eliminate one of the aforementioned drive trains from the cradle support to the work head. A further object is to provide a machine in which the magnitude of the rectilinear motion of the work head, (c) above, may be varied by a machine adjustment and without resort to change gears.

According to one aspect of the invention the machine comprises a frame, a tool-carrying cradle rotatable in the frame, a column member adjustable relative to the frame about an axis perpendicular to and intersecting the cradle axis, a work head member reciprocable on the column member in a direction parallel to the first-mentioned axis, a work spindle rotatable in the work head member about an axis perpendicular to and intersecting the first-mentioned axis, a drive train for connecting the cradle, work spindle and work head member for effecting simultaneous oscillation and rotation respectively of the cradle and the work spindle and reciprocation of the work head member, said drive train comprising a cam rotatable in one of said members for reciprocating the work head member, and said drive train including a unidirectionally rotatable shaft geared to both said cam and the work spindle for rotating each of them unidirectionally.

According to another aspect of the invention the machine comprises the column or other support, a work head or other slide movable rectilinearly on the support, a lever fulcrumed on the support and having a follower for the cam, a straight guideway on the slide extending at an angle to the direction in which the slide is movable, a bearing member engaging the guideway, and means for adjusting the bearing member rectilinearly on the lever in a direction radial of the fulcrum of the lever, the cam being so shaped that angular motion of the cam and the rectilinear motion of the slide produced by such motion will be in constant velocity ratio through a part of each rotation of the cam.

While the invention is applicable to both gear cutting and gear grinding machines, the following detailed description is made with reference to the accompanying drawings which illustrate the invention as applied in the preferred manner to a gear grinding machine. In the drawings.

Figure 4:
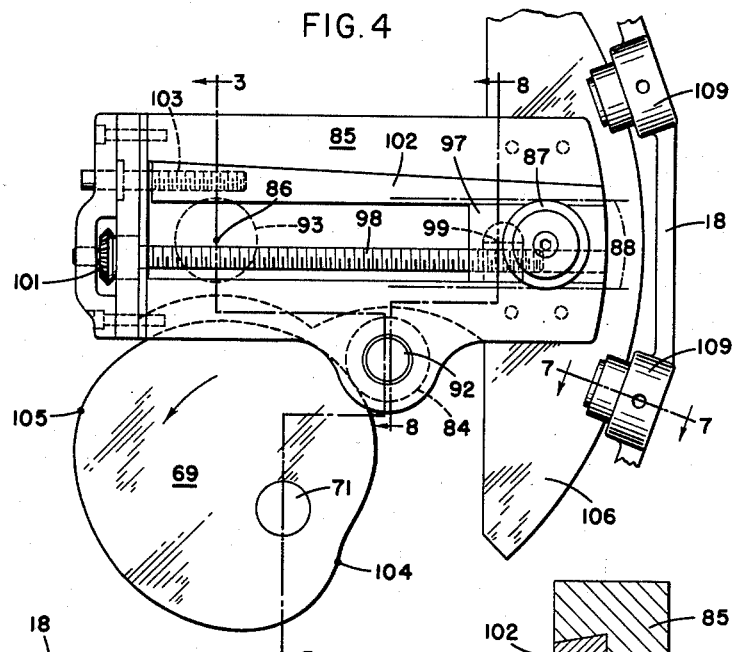
Fig. 4 is a view of the cam mechanism for effecting the rectilinear motion of the work head on the column, the view being as seen from plane 4—4 of Fig. 3.
Figure 7:
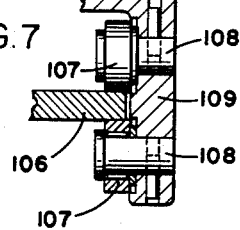
Figure 8:
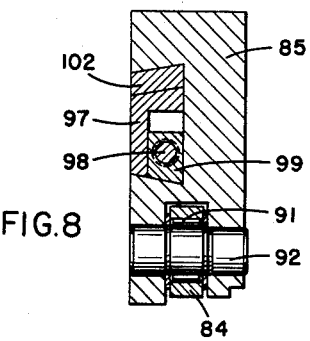
Figure 9:
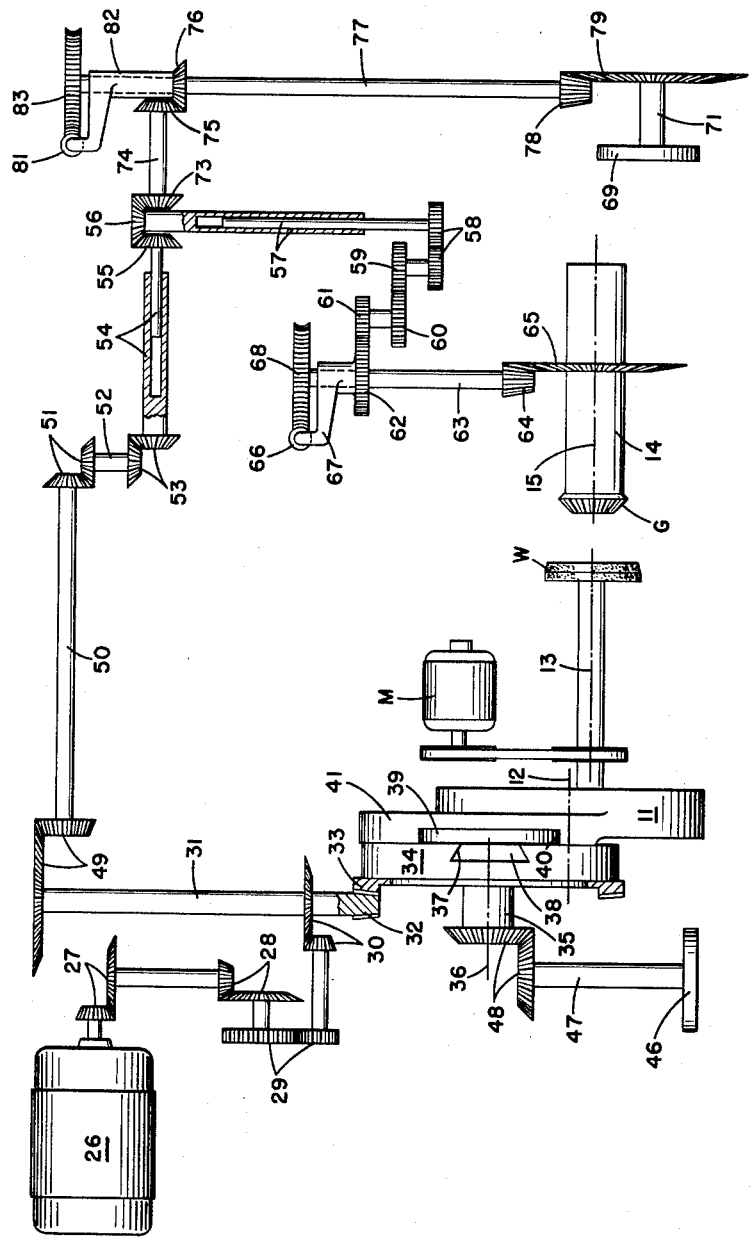

Figs. 7 and 8 are detail views in the respective planes 7—7 and 8—8 of Fig. 4; and, Fig. 9 is a drive diagram of the machine.

Figure 1:
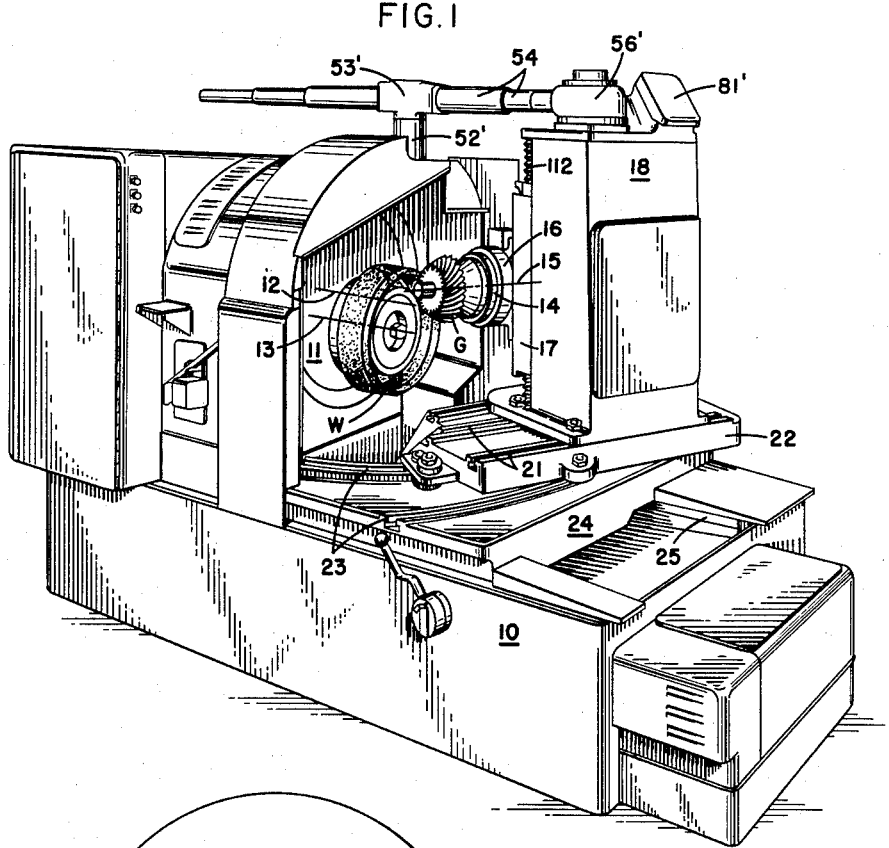
Fig. 1 is a perspective view of the entire machine.
Figure 2:
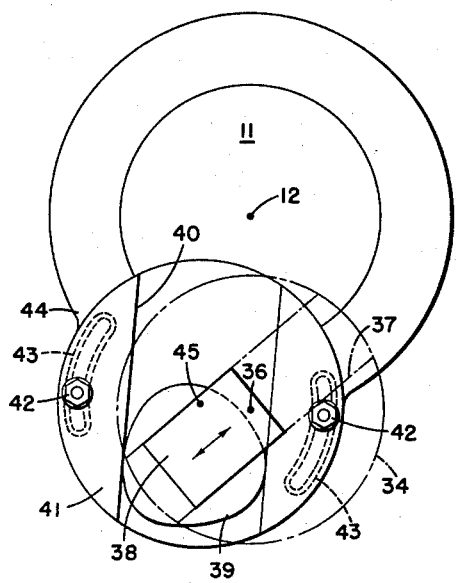
Fig. 2 is a diagrammatic view of a cam drive mechanism for the cradle.

The machine comprises a frame 10 on which a cradle 11 is mounted for rotation about a horizontal axis 12, Figs. 1, 2 and 9. Rotatable on the cradle, about axis 13, is the tool which in this case is a cup-shaped grinding wheel W. If desired a face mill cutter might be substituted for it. The workpiece, gear G, is mounted on a work spindle 14 journaled for rotation about horizontal axis 15 in a work head 16 which is adjustable vertically on a vertical slide 17 on column 18. This adjustment is effected by turning a calibrated screw 19 after first loosening threaded fasteners 20 which clamp the work head to the slide. The column 18 is adjustable horizontally, in the direction of axis 15, along ways 21 on a swinging base 22. The latter is adjustable around arcuate ways 23 on sliding base 24 about a vertical axis, not shown, but which intersects the axes 12 and 15 at right angles. The sliding base is adjustable and movable horizontally along ways 25 on frame 10 in the direction of axis 12. By these adjustments the gear G may be properly positioned to have the teeth thereof ground by the wheel W. The wheel is adjustable on the cradle by means, not shown, which may be of the kind disclosed in Patent 2,252,743 to E. Wildhaber. It is driven by a motor M, Fig. 9, carried by the cradle and independent of the main machine drive next to be described.

A main drive motor 26, Fig. 9, is mounted on frame 10, and through bevel reduction gears 27 and 28, rate-of-roll change gears 29 and bevel reduction gears 30 drives a main shaft 31. On this shaft is a bevel pinion 32 meshing with a ring gear 33 secured to a plate 34 that is fixed onto a shaft 35 journaled for rotation in the frame about axis 36. The plate has a diametral slot 37 along which there is adjustable, in the direction of the arrow in Fig. 2, a block 38 carrying a cam 39 which is confined in a diametral slot 40 in a plate 41. By means of an adjustable connection comprising threaded fasteners 42 and arcuate slots 43 in part 44 of the cradle, the plate 41 is adjustable angularly on the cradle about axis 45. The arrangement, described in detail in afore-mentioned Patent 2,252,743, is such that as the cam assembly 34, 39 rotates about axis 36, Fig. 2, the cradle assembly 41, 44 is oscillated back and forth about cradle axis 12.

The cam 39 is constant in diameter in the sense that in all positions it contacts the opposite sides of slot 40. It is so shaped as to cause the swing of the cradle clockwise in Fig. 1 to be in substantially constant velocity ratio to cam rotation. By appropriate adjustment of plate 41 on part 44 of cradle 11 and concomitant adjustment of cam-carrying block 38 along slot 37, the angle of cradle motion can be varied through a certain range without appreciably affecting this constant velocity relationship. By means of a set of several cams 39, interchangeably connectible to the block 38, the entire range of cradle angular motion is covered.

During the return swing of the cradle the wheel W is held in a retracted position clear of the work. Such retraction, and also the subsequent advance preceding the next forward swing of the cradle, is effected by suitable means shown in Patent 2,252,743, but not here. These means are actuated by a cam 46 mounted on a shaft 47 rotated in frame 10 at the same angular velocity as shaft 35 by a drive comprising bevel gears 48.

The work spindle 14 is driven from main shaft 31 through a gear train comprising bevel gears 49, shaft 50, bevel gears 51, shaft 52, bevel gears 53, telescoping shaft 54, bevel gears 55 and 56, telescoping shaft 57, gears 58, ratio-of-roll change gears 59, 60, 61 and 62, shaft 63, pinion 64 and bevel gear 65 on the spindle. Shaft 52 is a vertical shaft journaled in the portion of frame 10 adjacent the cradle and extending through tubular housing 52', Fig. 1; gears 53 are in housing 53'; telescoping shaft 54 is an overhead shaft extending to column 18; gears 55, 56 are in housing 56'; and shaft 57 extends vertically within the column, its upper end being journaled in the column while its lower end is journaled in the work head 16.

By the use of change gears 59–62 of appropriate tooth number combination the work gear G can be rotated in the desired velocity ratio to the swing of the cradle during which grinding occurs. Change gear 62 is connected to shaft 63 by a fine angular adjustment device comprising an adjusting worm 66 rotatable on a bracket 67 keyed to the gear 62, and a worm wheel 68 keyed to shaft 63. By manually rotating worm 66 the work G may be rotated through fine angles for dividing stock.

Figure 3:
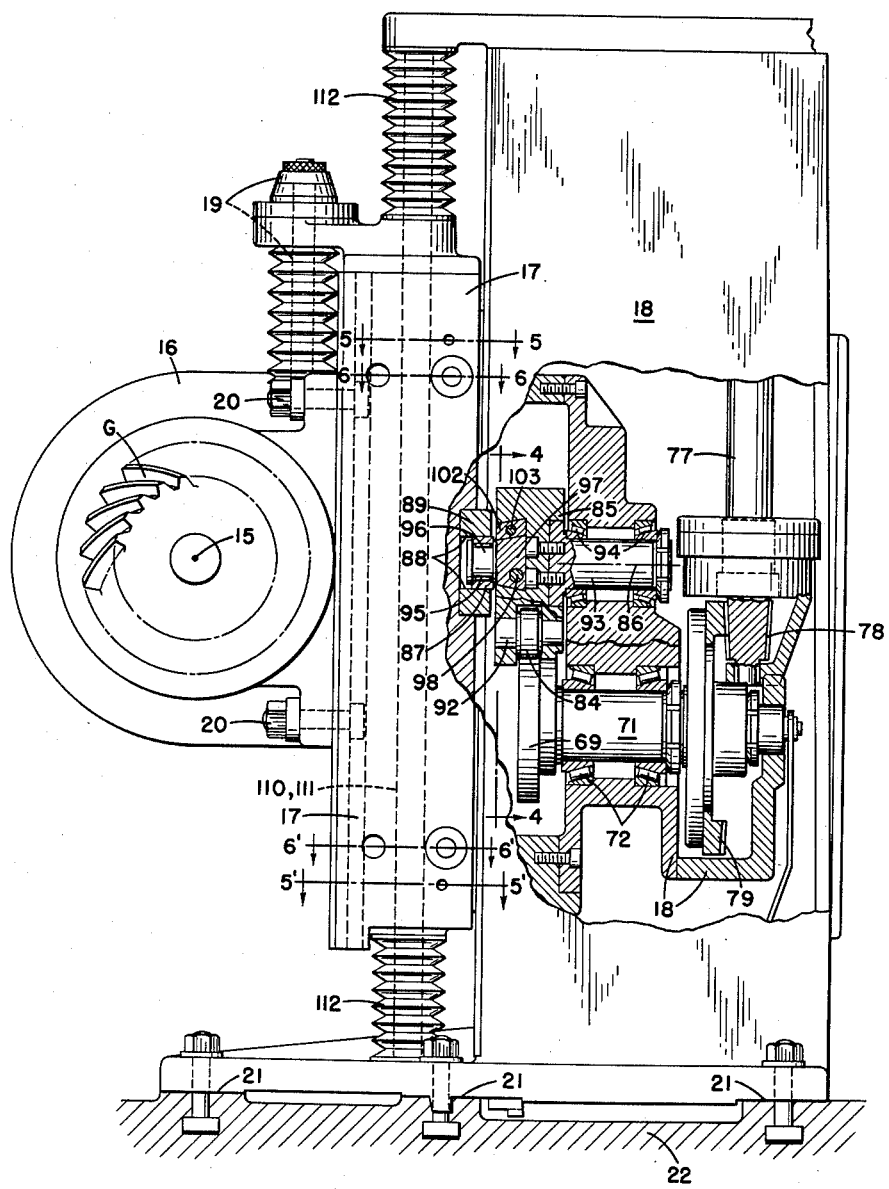
Fig. 3 is a front view of the work head and its supporting column, the view being partly in vertical section in the planes designated by section line 3—3 of Fig. 4.

The mechanism of the present invention comprises a cam 69 on a shaft 71, Figs. 3, 4 and 9, journaled for rotation on bearings 72 in column 18. The cam is driven from bevel gear 56 through a bevel gear 73, shaft 74, bevel gears 75 and 76, shaft 77, bevel pinion 78 and bevel gear 79 on shaft 71. Shafts 74 and 77 are journaled for rotation in the column. Gear 76 is connected to the shaft 77 by another fine division device. This device comprises a manually rotatable worm 81 on a bracket 82 that is keyed to the gear 76 and is rotatable on shaft 77, and a worm wheel 83 keyed to the shaft 77. By this device, which is located beneath cover 81' in Fig. 1, the phase relationship between cam 69 and cam 39 can be adjusted. The gears in the train are of such tooth number combination that these cams rotate at the same angular velocity.

A follower roller 84 for cam 69 is carried by a lever 85 which is fulcrumed to the column 18 on axis 86, and the lever carries another roller 87 which is confined between parallel upper and lower walls 88 of a horizontal slot in a plate 89 fixed to vertical slide 17. As shown in Fig. 8, roller 84 is rotatable on bearing rollers 91 on a pin 92 fixed to the lever. The fulcrum of the lever comprises a stub shaft 93 fixed to the lever and journaled in the column in roller bearings 94. The roller 87 is adjustable on the lever radially of the fulcrum axis 86, for this purpose being mounted on bearing rollers 95 on trunnion 96 of a block that is slidable along a guide slot in the lever. An adjusting screw 98 is threaded to a nut 99 carried by the block and is journaled for rotation in the lever. Such rotation is effected by means of a wrench-operated pinion (not shown) which meshes with a bevel gear 101 on the adjusting screw. After the block and roller assembly 97, 87 has been adjusted, the block is clamped to the lever by tightening a tapered gib 102 by means of screw 103. In Fig. 4 the roller 87 is shown in its outer limit position of adjustment so that rotation of cam 69 will produce maximum vertical motion of the work head, while in Fig. 3 the roller is shown in its innermost position wherein it is aligned with axis 86 so that rotation of the cam will produce no work head motion whatever. Cam 69 is so shaped that during the rotation thereof which occurs while cutting is taking place, i.e. while the portion of the cam between points 104 and 105 is acting on roller 84, the slide and work head assembly 16, 17 is moved upwardly in constant velocity ratio to rotation of the cradle in a clockwise direction in Fig. 1. This constancy of velocity ratio exists regardless of the position of adjustment of roller 87.

The lever 85 has secured thereto a segmental guide plate 106, Figs. 4 and 7, whose peripheral portion is supported between upper and lower pairs of roller bearing guide rollers 107, these rollers being mounted on pins 108 supported by bosses 109 on the column. The plate and rollers are for the purpose of supporting the distal end of the lever against twisting.

Figure 5:
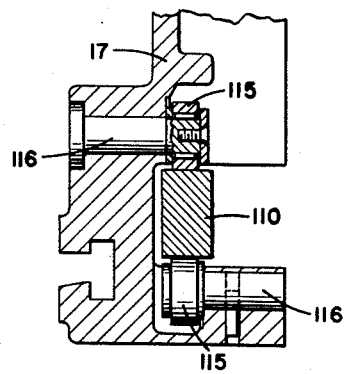
Fig. 5 is a detail sectional view in either plane 5—5 or plane 5'—5' of Fig. 3.
Figure 6:
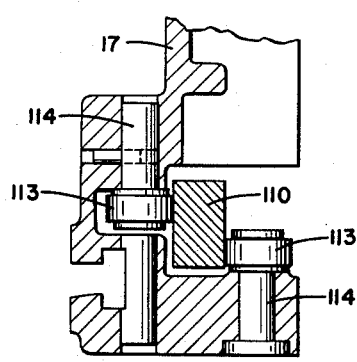
Fig. 6 is a detail sectional view in either plane 6—6 or plane 6'—6' of Fig. 3.

For supporting the slide 17 for reciprocation on column 18 two laterally spaced vertical guide bars 110 and 111 of rectangular cross-section are secured to the column at their upper and lower ends, and also at points approximately midway between their upper and lower ends. The upper and lower end portions of the bars are enclosed in flexible bellows-like boots 112, Fig. 3. One of the guide bars, 110, appears in Figs. 5 and 6. Roller bearing rollers 113 supported on pins 114 on the slide 17 engage two opposite faces of both bars in the manner shown in Fig. 6. Similar rollers 115 supported on pins 116 engage the other two faces of bar 110 only.

For generating bevel of hypoid gears of small or usual cone distance, by the now conventional method disclosed in E. Wildhaber Patent No. 2,252,743, the block 97 of the present machine is adjusted to bring the axis of roller 87 into coincidence with pivot axis 86, so that rotation of cam 69 will not effect vertical motion of the work spindle 16, and, preferably, the slide 17 is clamped to the column 18. For generating long-cone-distance bevel or hypoid gears the block 97 is so adjusted that the cam 69 will provide the desired amount of vertical motion of the work spindle in relation to the rotation of the cradle and the rotation of the work spindle, in accordance with the principles explained in afore-mentioned Patent No. 2,824,498. For generating cylindrical or spur gears, of the kinds disclosed in Figs. 4 and 5 of said Patent No. 2,824,498, the cam 39 of the present machine is removed, the cradle 11 is locked against rotation, and the block 97 is so adjusted that the vertical motion of the work spindle will be in the appropriate ratio to its rotation to generate the tooth surfaces of the work gear.

Having now described the machine and its mode of operation, what I claim as my invention is:

1. A machine for producing gears comprising a frame, a tool-carrying cradle rotatable in the frame, a column member adjustable relative to the frame about an axis perpendicular to and intersecting the cradle axis, a work head member reciprocable on the column member in a direction parallel to the first-mentioned axis, a work spindle rotatable in the work head member about an axis perpendicular to and intersecting the first-mentioned axis, a drive train for connecting the cradle, work spindle and work head member for effecting simultaneous oscillation and rotation respectively of the cradle and the work spindle and reciprocation of the work head member, said drive train comprising a cam rotatable in one of said members for reciprocating the work head member, and said drive train including a unidirectionally rotatable shaft geared to both said cam and the work spindle for rotating each of them unidirectionally.

2. A machine according to claim 1 in which said drive train includes another rotatory cam for oscillating the cradle, said cams being so shaped that the rectilinear motion of the work head member and the angular motion of the cradle are in substantially constant velocity ratio to rotation of the work spindle during a part of each rotation of the cams.

3. A machine according to claim 1 in which the work head member is adjustable on a slide which is reciprocable on the column in the same direction that the work head member is adjustable, the cam is journaled for rotation in the column member, and there is a cam follower arranged to reciprocate the slide upon rotation of the cam.

4. A machine for producing gears comprising a support, a slide movable rectilinearly on the support, a cam rotatable on the support, a lever fulcrumed on the support and having a follower for the cam, a straight guideway on the slide extending at an angle to the direction in which the slide is movable, a bearing member engaging the guideway, and means for adjusting the bearing member rectilinearly on the lever in a direction radial of the fulcrum of the lever, the cam being so shaped that angular motion of the cam and the rectilinear motion of the slide produced by such motion will be in constant velocity ratio throughout a part of each rotation of the cam.

5. A machine according to claim 4 in which the slide comprises a work head having a work spindle rotatable therein about an axis perpendicular to the direction of slide motion, and the cam is geared to the work spindle for rotation in time therewith.

6. A machine according to claim 5 in which said gearing includes ratio change gears for varying the angular velocity ratio between the cam and the work spindle.

7. A machine according to claim 5 in which there is a tool-carrying cradle rotatable relative to the support about an axis disposed in a plane parallel to the axis of rotation of the work spindle, and a drive train including change gears connecting the spindle and cradle respectively for rotation and for oscillation about their respective axes in predetermined velocity ratio.

8. A machine according to claim 7 in which said drive train includes a rotary cam and a follower for the cam connected to the cradle, said cam and follower being so proportioned and so related to the first-mentioned cam as to effect substantially constant velocity angular motion of the cradle while said slide is moving in constant velocity ratio relative to said first-mentioned cam.

9. A machine according to claim 4 in which said bearing member comprises a roller arranged in said guideway on the slide, and said means for adjusting the same comprises a block rotatably supporting said roller and arranged for adjustment along a straight radial guideway on the lever.

References Cited in the file of this patent
UNITED STATES PATENTS

| | | |
|---|---|---|
| 2,003,883 | Grundstein | June 4, 1935 |
| 2,252,743 | Wildhaber | Aug. 19, 1941 |
| 2,824,498 | Baxter et al. | Feb. 25, 1958 |